US011289966B2

(12) United States Patent
Pourchet et al.

(10) Patent No.: US 11,289,966 B2
(45) Date of Patent: Mar. 29, 2022

(54) PREFABRICATED COIL FOR A DIRECT DRIVE

(71) Applicant: ETEL S.A., Motiers (CH)

(72) Inventors: Johann Pourchet, La Chaux de Gilley (FR); Jeremy Anstett, Pontarlier (FR)

(73) Assignee: ETEL S.A., Motiers (CH)

( * ) Notice: Subject to any disclaimer, the term of this patent is extended or adjusted under 35 U.S.C. 154(b) by 269 days.

(21) Appl. No.: 16/665,050

(22) Filed: Oct. 28, 2019

(65) Prior Publication Data
US 2020/0136456 A1 Apr. 30, 2020

(30) Foreign Application Priority Data

Oct. 29, 2018 (EP) .................................... 18203020

(51) Int. Cl.
H02K 3/32 (2006.01)
H02K 1/14 (2006.01)
H02K 3/18 (2006.01)

(52) U.S. Cl.
CPC ............ *H02K 3/325* (2013.01); *H02K 1/146* (2013.01); *H02K 3/18* (2013.01)

(58) Field of Classification Search
CPC ............ H02K 3/32; H02K 3/325; H02K 3/18; H02K 1/146; H02K 3/34; H02K 3/28; H02K 15/066; H02K 15/00; Y10T 29/49009
See application file for complete search history.

(56) References Cited

U.S. PATENT DOCUMENTS 3,297,970 A    1/1967   Jones
3,378,800 A    4/1968   Liberman
5,642,013 A    6/1997   Wavre
(Continued)

FOREIGN PATENT DOCUMENTS

DE    1046755 B    12/1958
DE    1789162 A1    4/1976
(Continued)

OTHER PUBLICATIONS

DE-102012206039-A1 machine translation on Sep. 19, 2021.*

Primary Examiner — Quyen P Leung
Assistant Examiner — Leda T Pham
(74) Attorney, Agent, or Firm — Leydig, Voit & Mayer, Ltd.

(57) ABSTRACT

A prefabricated coil for placement on a tooth for a direct drive is orthocyclically wound from a wire of circular cross section. The coil includes two straight portions having an inner surface facing an interior of the coil and an outer surface opposite and parallel to the inner surface. A distance between the inner surface and the outer surface defines a thickness of the coil. Two coil overhangs connect the straight portions. A distance between the coil overhangs defines a height of the straight portions. The inner and outer surfaces of the straight portions have the height of the straight portions and a width of the straight portions. A sheet-like insulator covers the straight portions. The wire and the sheet-like insulator are bonded together such that the coil is self-supporting under the application of pressure and temperature. The sheet-like insulator has a joint region at the outer surface.

6 Claims, 5 Drawing Sheets

(56) References Cited

U.S. PATENT DOCUMENTS

| | | | | |
|---|---|---|---|---|
| 6,137,201 A * | 10/2000 | Umeda | ............... | H02K 1/165 |
| | | | | 310/179 |
| 2009/0267441 A1 * | 10/2009 | Hiramatsu | ........... | H02K 15/066 |
| | | | | 310/208 |
| 2011/0050151 A1 * | 3/2011 | El-Antably | ............. | H02P 29/50 |
| | | | | 318/717 |
| 2014/0015367 A1 * | 1/2014 | Umehara | ............... | H02K 3/38 |
| | | | | 310/208 |

FOREIGN PATENT DOCUMENTS

| | | | | |
|---|---|---|---|---|
| DE | 102012206039 A1 * | 10/2013 | ............ | H02K 15/10 |
| DE | 102012206039 A1 | 10/2013 | | |
| EP | 0793870 B2 | 6/2004 | | |
| GB | 1079815 A | 8/1967 | | |
| JP | 6098845 A | 6/1985 | | |
| JP | 2017046515 A | 3/2017 | | |

\* cited by examiner

PREFABRICATED COIL FOR A DIRECT DRIVE

CROSS-REFERENCE TO PRIOR APPLICATIONS

Priority is claimed to European Patent Application No. EP 18203020.5, filed on Oct. 29, 2018, the entire disclosure of which is hereby incorporated by reference herein.

FIELD

The present invention relates to prefabricated coils for direct drives. Such coils are, for example, placed on teeth of a stator of a direct drive. Due to the high operating voltage of such drives, good insulation of the coils from the stator and between the phases of the drive is particularly important.

BACKGROUND

EP 0793870 B2 describes linear and rotary direct drives where a stator has teeth with straight flanks, on which the prefabricated coils can be placed. A coil is placed on each tooth or on every other tooth so that, in either case, the gaps between the teeth are filled to the extent possible with coil windings. In this context, one speaks of a maximally possible fill factor. Due to the high operating voltage of several hundred volts, it is necessary to provide for good insulation of the coils.

DE 102012206039 A1 describes prefabricated coils where insulating paper is wrapped around the straight portions between the overhangs of the coils. Two layers of this insulating paper overlap each other on an outer surface of the coil that faces away from the interior of the coil and from the tooth. The windings in the layers of these coils lie on top of each other without offset, which results in a non-optimal fill factor (i.e., percentage of copper between the teeth). However, this type of winding avoids certain problems in the subsequent compression of the coil together with the insulating paper, as will be explained in more detail further below.

DE 1789162, which forms the basis for the present invention, describes winding coils orthocyclically to increase the fill factor. In that approach, the wires of a layer are disposed between the wires of the underlying layer, so that the centers of three contacting wires form an equilateral triangle. In addition, it is proposed to compress the coil by pressure and temperature, thereby deforming the wires into a hexagonal cross-sectional shape. In this process, an insulating layer that surrounds the wire of the coil winding melts, thereby causing the coil to be bonded together into a unitary structure without creating short-circuits between the individual windings. However, such a coil is not optimally insulated from the environment.

SUMMARY

In an embodiment, the present invention provides a prefabricated coil for placement on a tooth for a direct drive which is orthocyclically wound from a wire of circular cross section. The coil includes two straight portions having an inner surface facing an interior of the coil and an outer surface opposite and parallel to the inner surface. A distance between the inner surface and the outer surface defines a thickness of the coil. Two coil overhangs connect the straight portions. A distance between the coil overhangs defines a height of the straight portions. The inner and outer surfaces of the straight portions have the height of the straight portions and a width of the straight portions. A sheet-like insulator covers the straight portions. The wire and the sheet-like insulator are bonded together such that the coil is self-supporting under the application of pressure and temperature. The sheet-like insulator has a joint region at the outer surface of the straight portions.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

In an embodiment, the present invention provides a prefabricated coil for a direct drive which coil has a high fill factor and is reliably insulated.

In an embodiment, a prefabricated coil is provided for placement on a tooth for a direct drive, the coil being orthocyclically wound from a wire of circular cross section and having two straight portions as well as two coil overhangs connecting the straight portions. The distance between the coil overhangs defines a height of the straight portions. The straight portions have an inner surface facing the interior of the coil and an outer surface opposite and parallel to the inner surface, which surfaces have the height of the straight portions and a width of the straight portions, the distance between the inner surface and the outer surface defining a thickness of the coil. The straight portions are covered by a sheet-like insulator. The wire and the sheet-like insulator are bonded together into a self-supporting coil under the application of pressure and temperature. The sheet-like insulator has a joint region at the outer surface.

In this way, a prefabricated coil is produced which, due to the orthocyclic winding and the additional compression under pressure and temperature, has a high fill factor and good stability and which is insulated particularly well by covering the straight portions of the coil with a sheet-like insulator.

In addition, by suitably configuring the joint region of the sheet-like insulator, the insulator can be prevented from being damaged by a concentrated pressure that occurs inside the coil as a result of the orthocyclic winding as the coil is bonded together into a unitary structure. For this purpose, the overlap must either be small enough (even to the point of no overlap at all in one approach) or large enough (even to the point of complete overlapping at the outer surface in one approach). A particularly advantageous embodiment is also obtained when each tooth carries a coil instead of every other tooth having a coil wrapped therearound. In that case, the overlap can be eliminated, provided care is taken that the joints of the sheet-like insulators of adjacent coils are staggered with respect to one another.

Further advantages and features of the present invention will be apparent from the following description of various embodiments, taken in conjunction with the figures.

Figure 1:
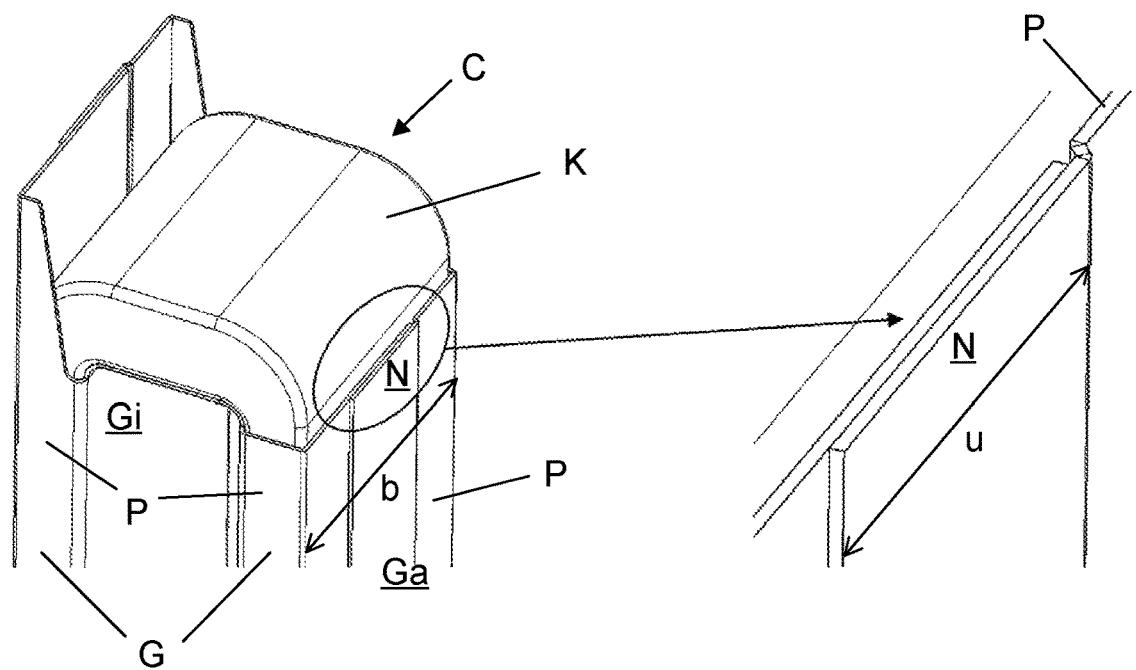
FIG. 1 shows a prefabricated coil according to a first embodiment of the present invention.

FIG. 1 shows a prefabricated coil C according to a first embodiment of the present invention. Two straight portions G of coil C are connected via two coil overhangs K. FIG. 1 shows only the upper half of coil C, and therefore only one coil overhang K can be seen. Such prefabricated coils C are intended to be inserted in slots between teeth of a stator so that each slot is filled with as much copper as possible. This can be achieved by equipping every other tooth of a stator with a coil C so that straight portions G completely fill the respective gaps to the adjacent teeth. Alternatively, it is possible to equip each tooth with a coil C so that each straight portion G fills one-half of a gap between the teeth. Coil overhangs K protrude from the sides of the lamination stack of the stator. Coil C is wound orthocyclically.

Straight portions G are covered with a sheet-like insulator P to insulate coil C from the stator, from the environment or also from adjacent coils C in addition to the insulation of the individual windings. Such a sheet-like insulator P is also referred to as insulating paper or insulating film, which may be an approximately 200 µm thick, biaxially oriented polyester film, such as is available, for example, under the trade name Mylar from the DuPont Company. This film may in addition be reinforced on one side or on both sides by a thin layer (about 50 µm) of aramid fibers, such as is available, for example, under the trade name Nomex from the DuPont Company.

Since sheet-like insulator P is wrapped around a respective straight portion G, it has a joint region N, which is located at an outer surface Ga facing away from the interior of coil C and thus from the tooth. As can be seen particularly well in the enlarged detail of FIG. 1, this joint region N is a region in which two layers of sheet-like insulator P overlap. This overlap region has a certain extent u along the width b of the coil, which is defined by the axial length of the slots and teeth of the stator.

In order to produce such prefabricated coils C, after covering straight portions G with sheet-like insulator P, coil C is compressed and bonded together into a unitary structure under the application of pressure and temperature in order to increase the stability of coil C and to increase the fill factor. In this process, the insulation of the wires of coil C melts and the windings and sheet-like insulator P are intimately bonded together. Wire D, from which coil C is wound, is typically made of copper and surrounded with a two-layer insulation. The copper has provided thereon a thin ceramic layer, which in turn is surrounded by a polymerizing cover layer that bonds the individual windings to one another, thereby giving coil C mechanical strength.

Figure 2:
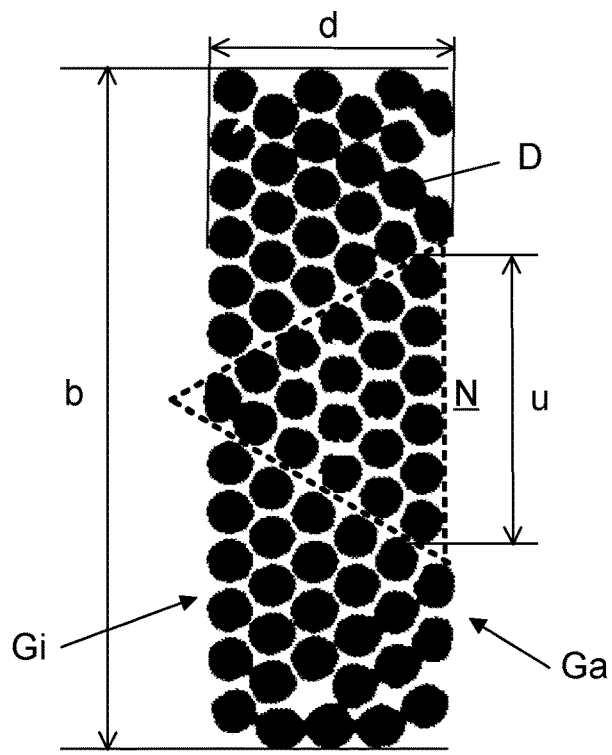
FIG. 2 shows a sectional view through a prefabricated coil according to the first embodiment.

FIG. 2, which illustrates a first embodiment of the present invention, is a sectional view showing a straight portion G of coil C after it has been subjected to pressure and temperature. Due to the locally increased thickness of sheet-like insulator P in joint region N, a slightly increased pressure is exerted on the wires D located directly under joint region N. In FIG. 2, about six wires D or windings of the outermost layer of coil C are affected by this. Because coil C is wound orthocyclically to increase the fill factor, as is readily apparent in FIG. 2, this additional pressure is transmitted only to the wires D that are disposed between the wires D of the outermost layer. Thus, the pressure is distributed over only five wires D of the next layer and therefore increases. This continues until the additional pressure is finally exerted on only one wire D at an inner surface Gi of coil C. In the cross-sectional view, it can be seen that this wire D exhibits a particularly pronounced deformation. At this point, the additional pressure is transmitted to the sheet-like insulator P located there. Sheet-like insulator P is not shown in FIG. 2.

The dashed lines plotted in FIG. 2 indicate the region in which a pressure introduced at outer surface Ga is increasingly concentrated due to the orthocyclic winding. An equilateral triangle is formed whose base is located under joint region N, where sheet-like insulator P overlaps, and whose opposite tip meets the opposite sheet-like insulator P. In this case, the height of this triangle corresponds to just the thickness d of coil C. Thus, in accordance with this first exemplary embodiment, sheet-like insulator P must be selected to be sufficiently stable to resist even locally greatly increased pressures.

The further exemplary embodiments of the present invention are intended to reduce or completely avoid the particularly high pressure on the sheet-like insulator P opposite the joint region N and to thereby prevent damage to the insulation and possible failure of a direct drive, or to allow selection of a smaller thickness for sheet-like insulator P (as compared to the first exemplary embodiment).

Figure 3:
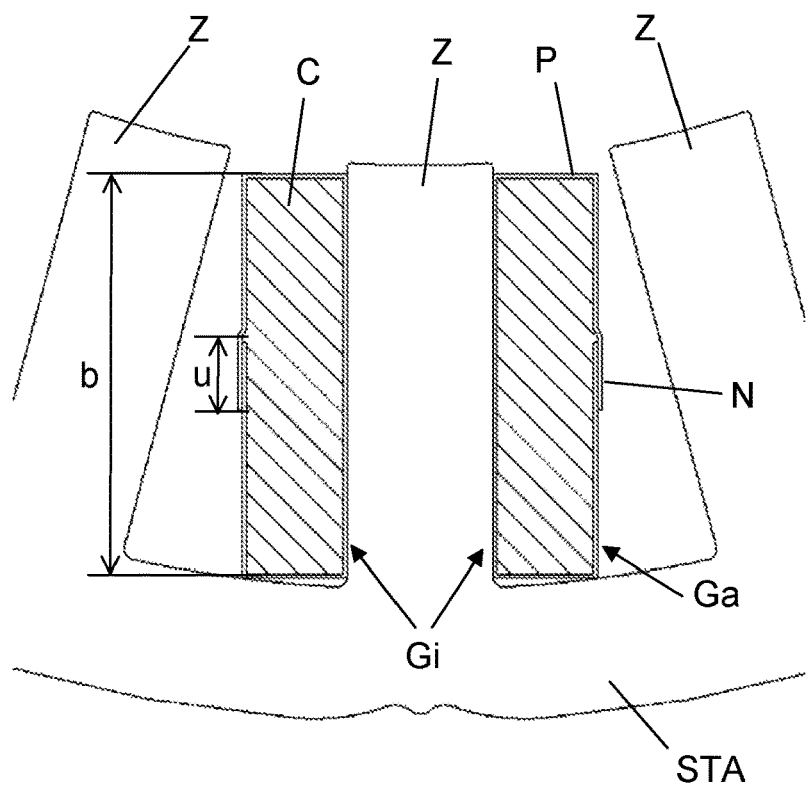
FIG. 3 shows a prefabricated coil according to a second embodiment of the present invention.

FIG. 3 shows a second exemplary embodiment. Here, a prefabricated coil C is already placed on a tooth Z of a stator STA. The teeth Z of stator STA have straight flanks for this purpose. The height of these tooth flanks corresponds approximately to width b of coils C.

According to the second embodiment of the present invention shown in FIG. 3, joint region N is configured such that the extent u of the overlap region is less than 1.16 times the thickness d of coil C. The factor 1.16 corresponds to approximately twice the inverse of the square root of 3. This factor results from the above-described equilateral triangle.

Figure 4:
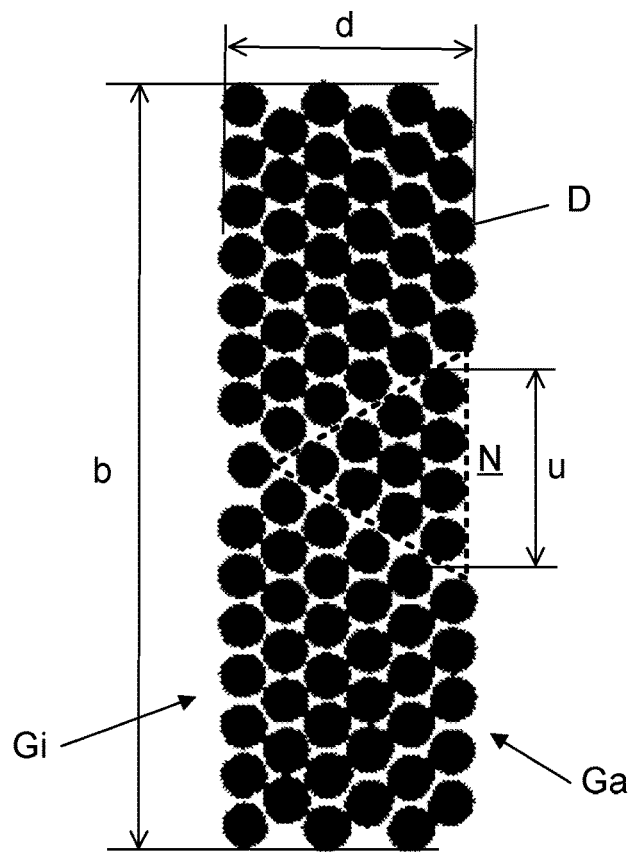
FIG. 4 shows a sectional view through a prefabricated coil according to the second embodiment.

As can be seen in FIG. 4, the tip of this triangle now lies inside of coil C. Thus, if the extent u of the overlap is selected to be sufficiently small, the high pressure from joint region N does not reach the sheet-like insulator located opposite. The extreme case of "no overlap" will be described further below as a separate exemplary embodiment.

Figure 5:
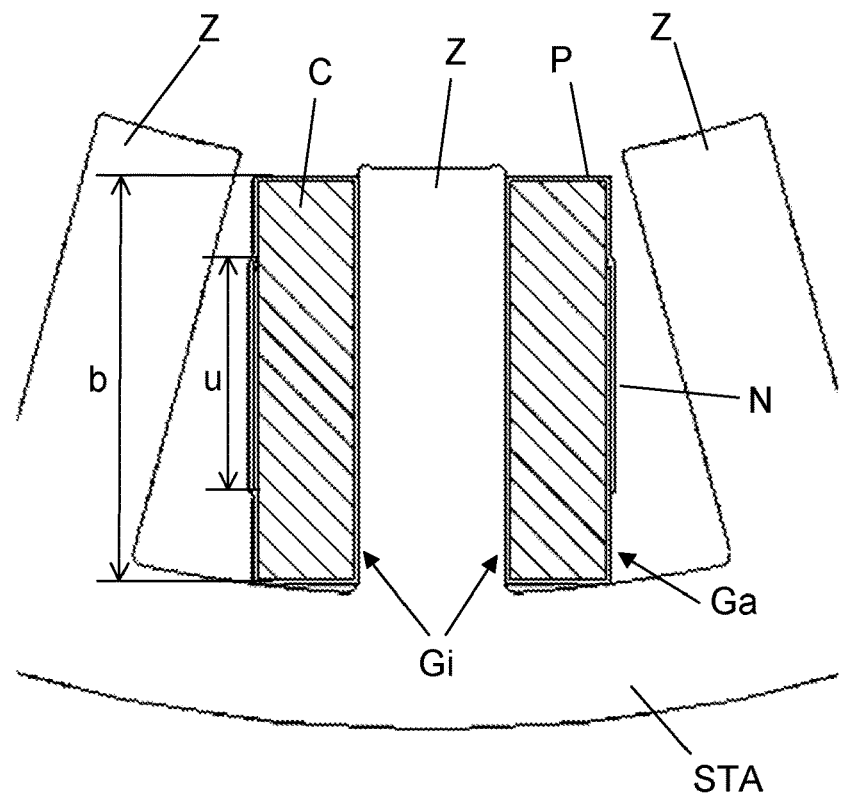
FIG. 5 shows a prefabricated coil according to a third embodiment of the present invention.

FIG. 5 shows a third exemplary embodiment. Again, a prefabricated coil C is placed on a tooth Z of a stator STA. The teeth Z of stator STA have straight flanks for this purpose. The height of these tooth flanks corresponds approximately to width b of coils C.

According to the third embodiment of the present invention shown in FIG. 5, joint region N is configured such that the extent u of the overlap region is greater than 1.16 times the thickness d of coil C, increased by three times the diameter of a wire D. Typical wire diameters are 0.5 mm-1.5 mm. A layer of coil C may include approximately 10-30 wires D arranged side by side. About 4-10 layers may lie on top of each other.

Figure 6:
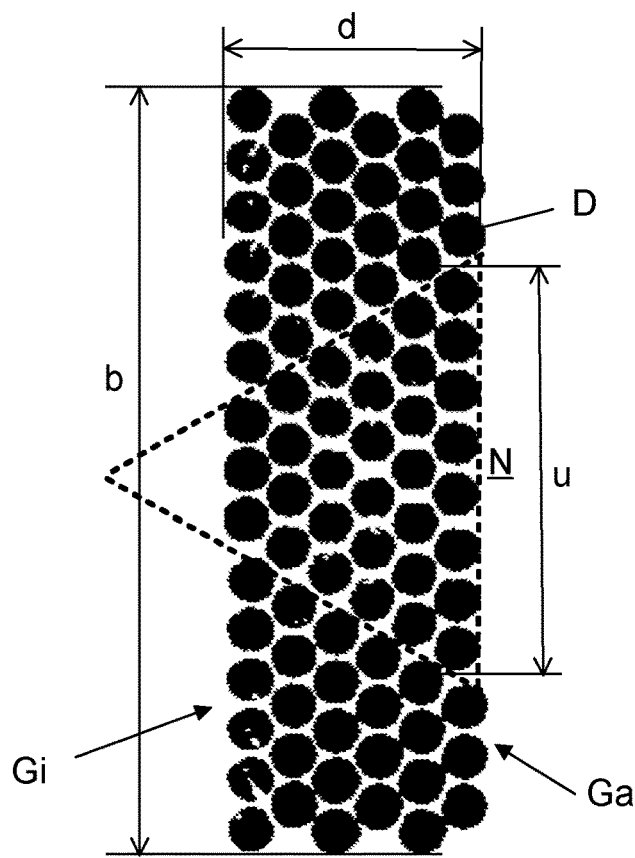
FIG. 6 shows a sectional view through a prefabricated coil according to the third embodiment.

As can be seen in FIG. 6, the tip of the triangle drawn in dashed line now lies outside of coil C. If the extent u of the overlap is selected to be sufficiently large, the high pressure from joint region N does, in fact, reach the sheet-like insulator P located opposite, but the pressure is still distributed over several (in this example 3) wires D, making it possible to prevent damage to sheet-like insulator P. The extreme case of "complete overlapping" will be described hereinafter as a separate exemplary embodiment.

Figure 7:
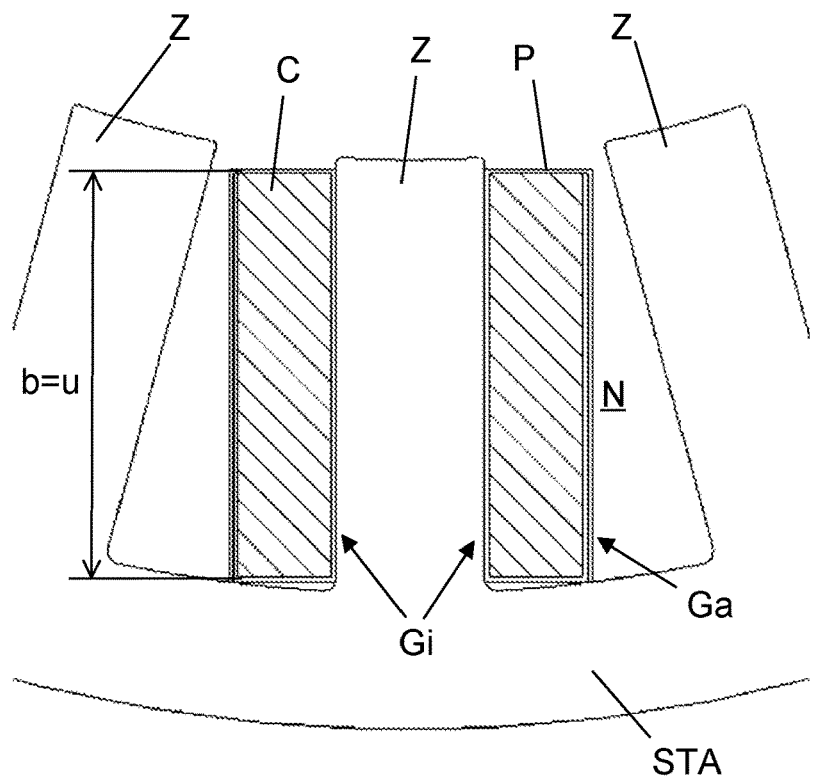
FIG. 7 shows a prefabricated coil according to a fourth embodiment of the present invention.

FIG. 7 shows, as a fourth embodiment, the extreme case of complete overlapping. Here, the extent u of the overlap and of joint region N corresponds to width b of coil C. The overlap, and thus joint region N, extends over the entire outer surface Ga. During the compression of this coil, development of a locally increased pressure, which could propagate into the interior of the coil and concentrate therein, is completely prevented.

Figure 8:
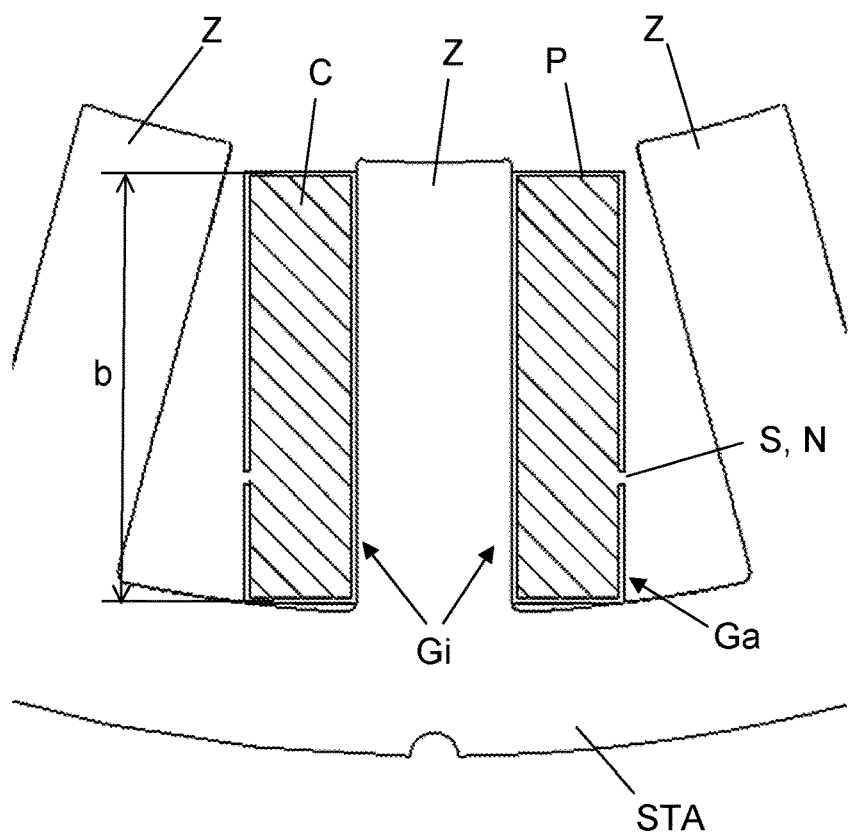
FIG. 8 shows a prefabricated coil according to a fifth embodiment of the present invention.

FIG. 8 shows, as a fifth embodiment, the extreme case of no overlap in joint region N. Rather, a butt joint S is formed at which the two ends or edges of sheet-like insulator P meet without overlapping each other. Since it is inevitable that a small gap forms in the insulation at this point, good insulation must be provided in another way. For example, butt joint S should preferably be located near the bottom of the slot between adjacent teeth Z because the distance to the adjacent tooth Z is larger here, at least in a rotary direct drive. In general, the position of the butt joint must be selected such that the distance to conductive portions of stator STA is maximized. Moreover, coil C may be encapsulated in stator STA with a potting compound that enhances the insulation. In addition, after the coil has been compressed, a strip of sheet-like insulator P may be glued over butt joint S without exerting further pressure on coil C. During the compression of this coil C, too, development of a locally increased pressure, which could propagate into the interior of coil C and concentrate therein, is completely prevented.

Figure 9:
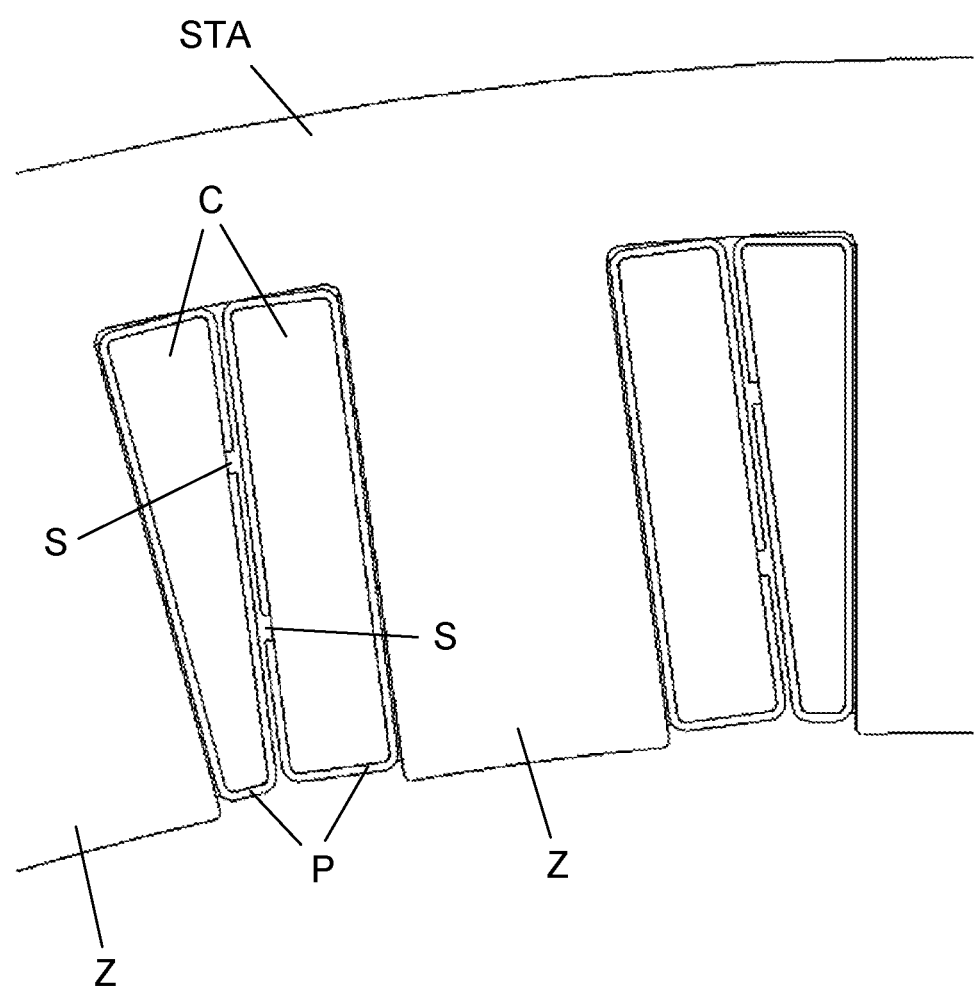
FIG. 9 shows a stator in which each tooth is equipped with a prefabricated coil according to the fifth embodiment.

FIG. 9 shows an alternative sixth embodiment. In a direct drive, a coil C according to the fifth embodiment may accordingly be wrapped around each tooth Z (instead of around every other tooth Z) of stator STA. Then, two straight portions G share a space between two teeth Z. The butt joints S of two adjacent coils C must then be staggered a sufficient distance with respect to one another so that each butt joint S is additionally insulated by the sheet-like insulator P of the adjacent coil C. Butt joints S could, for example, be spaced from each other and from the bottom of the slot and its opening by a distance of about one-third of width b of coil C respectively. In order to achieve reliable insulation, a distance of three millimeters can be assumed as a lower limit.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A direct drive comprising:
   a stator provided with teeth, wherein each tooth is equipped with a prefabricated coil, the coil being orthocyclically wound from a wire of circular cross section and comprising:
      two straight portions having an inner surface facing an interior of the coil and an outer surface opposite and parallel to the inner surface, a distance between the inner surface and the outer surface defining a thickness of the coil;
      two coil overhangs connecting the straight portions, a distance between the coil overhangs defining a height of the straight portions, the inner and outer surfaces of the straight portions having the height of the straight portions and a width of the straight portions; and
      a sheet-like insulator which covers the straight portions, the wire and the sheet-like insulator being bonded together such that the coil is self-supporting under the application of pressure and temperature, the sheet-like insulator having a butt joint at the outer surface of the straight portions,
   wherein the butt joints of two straight portions disposed together between two teeth are staggered with respect to one another in the direction of the width of the straight portions.

2. The direct drive as recited in claim 1, wherein the butt joint is insulated by a glued-on layer of an insulator or by potting compound.

3. The direct drive as recited in claim 1, wherein each of the butt joints are insulated by the sheet-like insulator of an adjacent one of the coils.

4. The direct drive as recited in claim 1, wherein the butt joints of the two straight portions disposed together between two teeth are spaced from each other in the direction of the width of the straight portions by at least 3 mm.

5. The direct drive as recited in claim 1, wherein the sheet-like insulator is a biaxially oriented polyester film.

6. The direct drive as recited in claim 5, wherein the biaxially oriented polyester film is reinforced on at least one side with a layer of aramid fibers.

* * * * *